(12) United States Patent
Takagi et al.

(10) Patent No.: US 9,416,851 B2
(45) Date of Patent: Aug. 16, 2016

(54) AUTOMATIC TRANSMISSION FOR VEHICLE

(71) Applicant: AISIN SEIKI KABUSHIKI KAISHA, Kariya-shi (JP)

(72) Inventors: Kiyoharu Takagi, Okazaki (JP); Atsuhiro Mase, Chita-gun (JP); Hideki Nakamura, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 21 days.

(21) Appl. No.: 14/602,870

(22) Filed: Jan. 22, 2015

(65) Prior Publication Data

US 2015/0247555 A1 Sep. 3, 2015

(30) Foreign Application Priority Data

Feb. 28, 2014 (JP) ................. 2014-037738

(51) Int. Cl.
*F16H 3/62* (2006.01)
*F16H 3/66* (2006.01)
*F16H 3/44* (2006.01)

(52) U.S. Cl.
CPC ............ *F16H 3/66* (2013.01); *F16H 3/666* (2013.01); *F16H 2003/442* (2013.01); *F16H 2200/0069* (2013.01); *F16H 2200/0073* (2013.01); *F16H 2200/0078* (2013.01); *F16H 2200/0082* (2013.01); *F16H 2200/201* (2013.01); *F16H 2200/2046* (2013.01); *F16H 2200/2048* (2013.01)

(58) Field of Classification Search
None
See application file for complete search history.

(56) References Cited

U.S. PATENT DOCUMENTS

| | | |
|---|---|---|
| 7,131,926 B2 | 11/2006 | Tiesler et al. |
| 7,828,688 B2 | 11/2010 | Phillips et al. |
| 2006/0135310 A1* | 6/2006 | Shim ............... F16H 3/663 475/282 |
| 2009/0209386 A1* | 8/2009 | Kim ................ F16H 3/666 475/275 |
| 2009/0312139 A1* | 12/2009 | Jang ............... F16H 3/666 475/275 |
| 2014/0162832 A1* | 6/2014 | Noh ................ F16H 3/666 475/311 |

FOREIGN PATENT DOCUMENTS

WO 2012/084370 A1 6/2012

OTHER PUBLICATIONS

European Search Report issued Aug. 26, 2015, by the European Patent Office, in corresponding European Patent Application No. 15151218.3. (9 pages).

* cited by examiner

*Primary Examiner* — Edwin A Young
(74) *Attorney, Agent, or Firm* — Buchanan Ingersoll & Rooney PC

(57) ABSTRACT

An automatic transmission includes first to third planetary gear mechanisms; a second sun gear, a second carrier, and a second ring gear in a velocity diagram being defined as a first element, a second element, and a third element, respectively, in a case where a single pinion type planetary gear mechanism is applied as the second planetary gear mechanism; and the second carrier, the second ring gear, and the second sun gear in a velocity diagram being defined as the first element, the second element, and the third element, respectively, in a case where a double pinion type planetary gear mechanism is applied as the second planetary gear mechanism. A first brake fixes a first sun gear to a housing, a second clutch connects the first sun gear and the third element, and a fourth clutch connects the second element and a third carrier when a reverse speed is established.

3 Claims, 9 Drawing Sheets

|  | CL1 | CL2 | CL3 | CL4 | B1 | B2 |
|---|---|---|---|---|---|---|
| 1st | ○ |  | ○ |  |  | ○ |
| 2nd |  | ○ | ○ |  |  | ○ |
| 3rd | ○ | ○ |  |  |  | ○ |
| 4th |  | ○ |  | ○ |  | ○ |
| 5th |  |  |  | ○ | ○ | ○ |
| 6th | ○ |  |  | ○ |  | ○ |
| 7th | ○ |  |  | ○ | ○ |  |
| 8th | ○ |  | ○ | ○ |  |  |
| 9th |  |  | ○ | ○ | ○ |  |
| 10th | ○ |  | ○ |  | ○ |  |
| 11th |  | ○ | ○ |  | ○ |  |
| Rev |  | ○ |  | ○ | ○ |  |

|      | CL1 | CL2 | CL3 | CL4 | B1 | B2 | CL5 |
|------|-----|-----|-----|-----|----|----|-----|
| 1st  | ○   |     | ○   |     |    | ○  |     |
| 2nd  |     | ○   | ○   |     |    | ○  |     |
| 3rd  | ○   | ○   |     |     |    | ○  |     |
| 4th  |     | ○   |     | ○   |    | ○  |     |
| 5th  |     |     |     | ○   | ○  | ○  |     |
| 6th  | ○   |     |     | ○   |    | ○  |     |
| 7th  | ○   |     |     | ○   | ○  |    |     |
| 8th  | ○   |     | ○   | ○   |    |    |     |
| 8th  | ○   |     |     | ○   |    |    | ○   |
| 9th  | ○   |     |     |     | ○  |    | ○   |
| 10th |     |     |     | ○   | ○  |    | ○   |
| 10th |     |     | ○   |     | ○  |    | ○   |
| 10th |     |     | ○   | ○   | ○  |    |     |
| 11th | ○   |     | ○   |     | ○  |    |     |
| 12th |     | ○   | ○   |     | ○  |    |     |
| Rev  |     | ○   |     | ○   | ○  |    |     |

F I G. 15
Prior Art

|      | CL11 | CL12 | CL13 | CL14 | B11 | B12 |
|------|------|------|------|------|-----|-----|
| 1st  |      | ○    | ○    |      |     | ○   |
| 2nd  | ○    | ○    |      |      |     | ○   |
| 3rd  |      | ○    |      |      | ○   | ○   |
| 4th  |      | ○    |      | ○    |     | ○   |
| 5th  |      | ○    |      | ○    | ○   |     |
| 6th  | ○    | ○    |      | ○    |     |     |
| 7th  | ○    |      |      | ○    | ○   |     |
| 8th  |      |      | ○    | ○    | ○   |     |
| 9th  | ○    |      | ○    |      | ○   |     |
| 10th |      | ○    | ○    |      | ○   |     |
| Rev  | ○    |      |      | ○    |     | ○   |

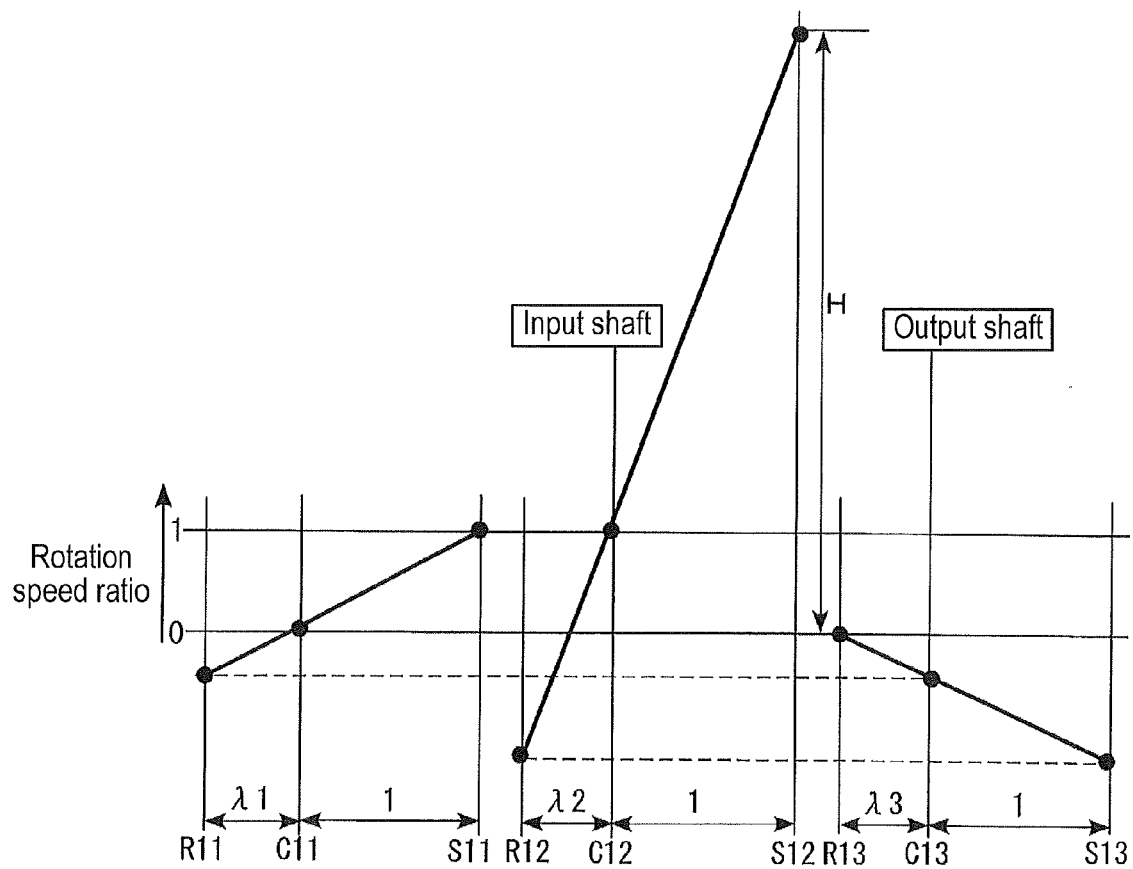

AUTOMATIC TRANSMISSION FOR VEHICLE

CROSS REFERENCE TO RELATED APPLICATIONS

This application is based on and claims priority under 35 U.S.C. §119 to Japanese Patent Application 2014-037738, filed on Feb. 28, 2014, the entire content of which is incorporated herein by reference.

TECHNICAL FIELD

This disclosure generally relates to an automatic transmission for a vehicle.

BACKGROUND DISCUSSION

Known automatic transmissions for vehicle are disclosed in U.S. Pat. No. 7,828,688 (hereinafter referred to as Patent reference 1) and U.S. Pat. No. 7,131,926 (hereinafter referred to as Patent reference 2). The known automatic transmissions disclosed in Patent references 1 and 2 include three single pinion type planetary gear mechanisms and six engaging elements including two brakes and four clutches, and establish ten forward speeds and one reverse speed by engaging three elements among six engaging elements. As illustrated in FIG. 14, first to third planetary gear mechanisms P11-P13 are arranged in the mentioned order in a row from an input shaft N side to an output shaft T side. Elements that structure the first to third planetary gear mechanisms P11-P13 are referred to as first to third carriers C11-C13 that rotatably support first to third pinions Q11-Q13, first to third sun gears S11-S13, and first to third ring gears R11-R13.

The second carrier C12 is connected to the input shaft N. The second ring gear R12 is connected to the third sun gear S13. The second sun gear S12 is selectively fixed to a housing H by a first brake B11 and is selectively connected to the first sun gear S11 by a second clutch CL12. The second carrier C12 is selectively connected to the first sun gear S11 by a first clutch CL11.

The second ring gear R12 is selectively connected to the first carrier C11 by a third clutch CL13. The first ring gear R11 is connected to the third carrier C13. The first carrier C11 is selectively connected to the third ring gear R13 by a fourth clutch CL14. The third ring gear R13 is selectively fixed to the housing H by a second brake B12. The third carrier C13 is connected to the output shaft T.

FIG. 15 shows operation states of clutches CL11 to CL 14 and brakes B11 and B12, the operation states corresponding to each of speed stages. A circle provided in FIG. 15 indicates that the element is actuated (the element is in an ON state). FIG. 16 shows a velocity diagram in which the sun gears S11 to S13, the carriers C11 to C13, and the ring gears R11 to R13 that are elements for structuring the first to third planetary gear mechanisms P11-P13 when establishing a reverse speed, or reverse speed stage are arranged with intervals corresponding to gear ratios λ1-λ3 in a lateral axis direction, and rotation speed ratios corresponding to the elements are arranged in a vertical direction.

As shown in FIG. 16, according to an automatic transmission 10 for vehicle disclosed in Patent references 1 and 2, when establishing a reverse speed, the first clutch CL11 is operated to be in an ON state so that a rotation drive force of the input shaft N is inputted to the first sun gear S11. Further, drive force for reverse rotation is generated at the first ring gear R11 by connecting the first carrier C11 and the third ring gear R13 by establishing an ON state of the fourth clutch CL14, and by fixing the first carrier C11 by establishing an ON state of the second brake B12. The drive force for reverse rotation of the first ring gear R11 is outputted to the output shaft T via the third carrier C13. That is, according to the automatic transmission 10 for vehicle, the drive force for reverse rotation is generated only by the braking operation to the first planetary gear mechanism P11 and the input to the first planetary gear mechanism P11.

Then, because the third ring gear R13 is fixed and the third carrier C13 rotates in a reverse direction, the third sun gear S13 passively rotates in the reverse direction at speed faster than the third carrier C13. Further, because the second ring gear R12 is connected to the third sun gear S13, the second ring gear R12 rotates in the reverse direction. Because the rotation of the input shaft N is inputted to the second carrier C12, the second sun gear S12 comes to rotate at the high speed. That is, a rotation speed ratio of the second sun gear S12 corresponds to a value H that is calculated by adding an input rotation speed ratio to a value obtained by multiplying the reciprocal of the gear ratio λ2 (=the number of teeth of the second sun gear S12/the number of teeth of the second ring gear R12) and the sum of the absolute value of the rotation speed ratio of the second ring gear R12 and the input rotation speed ratio.

Thus, the second clutch CL12 that selectively engages the second sun gear S12 with the first sun gear S11 and the first brake B11 that selectively engages the second sun gear S12 to the housing H may be susceptible to the generation of the burning because a relative rotation speed is increased. Further, the durability of a bearing or the like that supports the second sun gear S12 declines significantly. In a case where an oil passage is formed at a shaft connected to the second sun gear S12, the durability of a sealing disposed on the shaft may be declined.

A need thus exists for an automatic transmission for a vehicle which is not susceptible to the drawback mentioned above.

SUMMARY

In light of the foregoing, the disclosure provides an automatic transmission for a vehicle, which includes a housing; three planetary gear mechanisms including a first planetary gear mechanism which is a single pinion type planetary gear mechanism, a second planetary gear mechanism which is one of a single pinion type planetary gear mechanism and a double pinion type planetary gear mechanism, and a third planetary gear mechanism which is a single pinion type planetary gear mechanism, the first planetary gear mechanism, the second planetary gear mechanism, and the third planetary gear mechanism being supported by the housing and being coaxial to a rotation axis; a second sun gear, a second carrier, and a second ring gear in an arranged order in a velocity diagram being defined as a first element, a second element, and a third element, respectively, in a case where the single pinion type planetary gear mechanism is applied as the second planetary gear mechanism; the second carrier, the second ring gear, and the second sun gear in an arranged order in a velocity diagram being defined as the first element, the second element, and the third element, respectively, in a case where the double pinion type planetary gear mechanism is applied as the second planetary gear mechanism; a first ring gear of the first planetary gear mechanism and a third sun gear of the third planetary gear mechanism being connected to each other, and the first element of the second planetary gear mechanism and a third ring gear of the third planetary gear mechanism being connected to each other; an input shaft supported by the housing to be rotatable about the rotation axis, the input shaft connected to a first carrier of the first planetary gear mechanism; an output shaft supported by the housing to be rotatable about the rotation axis, the output shaft connected to a third carrier of the third planetary gear mechanism; a first brake selectively fixing a first sun gear of the first planetary gear mechanism to the housing; a second brake selectively fixing the first element and the third ring gear which are connected to each other to the housing; a first clutch selectively connecting the first carrier and the third element; a second clutch selectively connecting the first sun gear and the third element; a third clutch selectively connecting the first ring gear and the second element; and a fourth clutch selectively connecting the second element and the third carrier. The first brake fixes the first sun gear to the housing, the second clutch connects the first sun gear and the third element, and the fourth clutch connects the second element and the third carrier when a reverse speed is established.

BRIEF DESCRIPTION OF THE DRAWINGS

The foregoing and additional features and characteristics of this disclosure will become more apparent from the following detailed description considered with the reference to the accompanying drawings, wherein:

FIG. 15 shows operation states of brakes and clutches at each of speed stages according to the known automatic transmission for the vehicle; and FIG. 16 shows a velocity diagram showing a rotation speed ratio of each element that structures the planetary gear mechanism when a reverse speed is established according to the known automatic transmission for the vehicle.

DETAILED DESCRIPTION

Figures 1, 2:
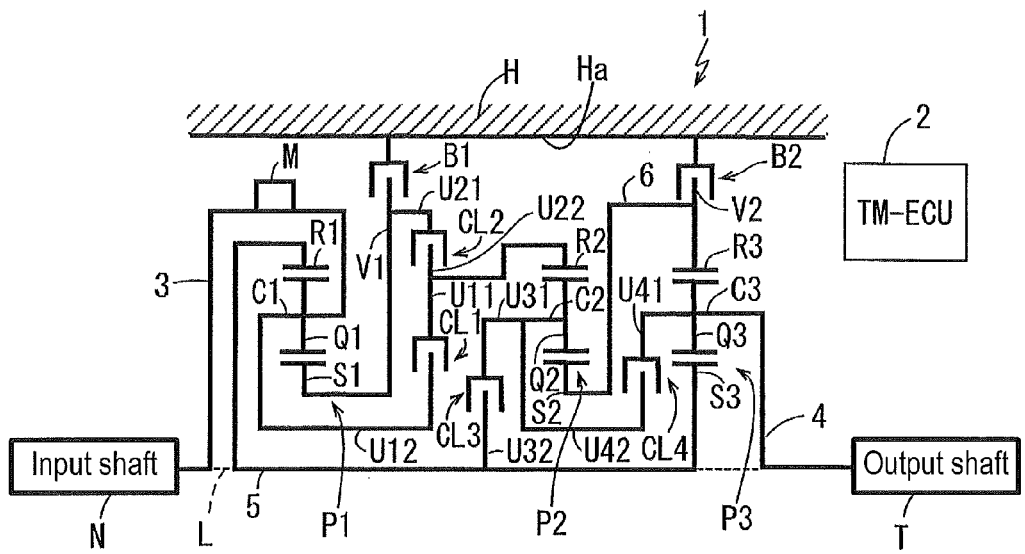
FIG. 1 is a schematic diagram of an automatic transmission for a vehicle according to a first embodiment disclosed here.
FIG. 2 shows operation states of brakes and clutches at each of speed stages according to the first embodiment disclosed here.

Embodiments of an automatic transmission for a vehicle will be described with reference to illustrations of drawing figures as follows. The automatic transmission for the vehicle is applied as a device for changing the speed of a rotation drive force outputted from an engine which is mounted to the vehicle. The rotation drive force of which the speed is changed by the automatic transmission for the vehicle is transmitted to driving wheels via a differential device, for example, and the vehicle moves forwards or backwards at a predetermined speed stage that is established by the automatic transmission for the vehicle.

An automatic transmission 1 for a vehicle according to a first embodiment will be explained with reference to FIG. 1. The automatic transmission 1 for the vehicle includes three single pinion type planetary gear mechanisms P1-P3 (first to third planetary gear mechanisms P1-P3) that are arranged in a direction of an axis from an input side (i.e., left-hand side in FIG. 1) towards an output side (i.e., right-hand side in FIG. 1), four clutches CL1-CL4 (first to fourth clutches CL1-CL4) selectively connecting elements that construct each of the planetary gear mechanisms P1-P3, two brakes B1, B2 (first and second brakes B1, B2) selectively engaging a predetermined element to a housing H, connection members 5, 6 connecting predetermined elements, connection members U11, U21, U31, U41, U12, U22, U32, U42 that connect the elements and the clutches CL1-CL4, fixing members V1, V2 for fixing the brake B1, B2 and the predetermined element, an input shaft N, and an output shaft T.

Further, according to the automatic transmission 1 for the vehicle, operation states of engaging elements including the first to fourth clutches CL1 to CL4 and the brakes B1, B2 are controlled on the basis of control signals from a vehicle control ECU (electronic control unit) 2. According to the embodiment, by actuating three engaging elements among the above described engaging elements including the first to fourth clutches CL1 to CL4 and the brakes B1, B2, a speed of a rotation drive force inputted from the input shaft N is changed to one of eleven forward speeds and one rearward speed to be outputted from the output shaft T. Details of the speed stages to be established and the operation states of the engaging elements according to the automatic transmission 1 for the vehicle will be described hereinafter.

The input shaft N and the output shaft T are supported by the housing H to be rotatable about a rotation axis L. The input shaft N is a shaft member that inputs the rotation drive force of the engine to the automatic transmission 1 for the vehicle via, for example, a clutch device. The output shaft T is disposed coaxially to the input shaft N and outputs the rotation drive force with changed speed to driving wheels via a differential device, for example.

Each of the planetary gear mechanisms P1 to P3 is a single pinion type planetary gear mechanism in which the pinion gears Q1 to Q3 that are rotatably supported by the carriers C1 to C3, respectively, are meshed with the sun gears S1 to S3 and the ring gears R1 to R3, respectively. The first to third planetary gear mechanisms P1 to P3 are arranged in the mentioned order from the input side. Elements of each of the planetary gear mechanisms P1 to P3 are defined as the first to third sun gears S1 to S3, the first to third carriers C1 to C3, and the first to third ring gears R1 to R3, respectively. According to the first embodiment, because the second planetary gear mechanism P2 that is a single pinion type planetary gear mechanism is applied, the second sun gear S2 corresponds to a first element, the second carrier C2 corresponds to a second element, and the second ring gear R2 corresponds to a third element of the disclosure in an arrangement order in the velocity diagram shown in FIG. 3.

The first planetary gear mechanism P1 includes the first sun gear S1 rotatably supported to be coaxial to the rotation axis L, the first ring gear R1, and the first carrier C1 that rotatably supports the first pinion gear Q1 that is meshed with the first sun gear S1 and the first ring gear R1. The second planetary gear mechanism P2 includes the second sun gear S2 rotatably supported to be coaxial to the rotation axis L, the second ring gear R2, and the second carrier C2 that rotatably supports the second pinion gear Q2 that is meshed with the second sun gear S2 and the second ring gear R2. The third planetary gear mechanism P3 includes the third sun gear S3 rotatably supported to be coaxial to the rotation axis L, the third ring gear R3, and the third carrier C3 that rotatably supports the third pinion gear Q3 that is meshed with the third sun gear S3 and the third ring gear R3.

Each of the brakes B1, B2 is an engaging element provided at the housing H and braking the rotation of the predetermined element. According to the embodiment, similar to the clutches C1 to C4, a hydraulic type brake that is actuated by a hydraulic pressure supplied from an oil passage formed on the housing H is applied as each of the brakes B1, B2. Thus, each of the brakes B1, B2 brakes the rotation of the targeted predetermined element by applying pads to a disc upon the supply of the hydraulic pressure from a hydraulic pressure pump that actuates on the basis of a control command, for example, by the control ECU 2. Then, when the supply of the hydraulic pressure by the hydraulic pressure pump is blocked, the pads are released from the disc to allow the rotation of the predetermined element.

Each of the clutches CL1 to CL4 is an engaging element selectively connecting plural elements. According to the embodiment, a clutch which is normal open type and hydraulic pressure type that is actuated upon receiving the supplied hydraulic pressure is applied as each of the clutches CL1 to CL4. Thus, each of the clutches CL1 to CL4 makes plural clutch plates contact one another to connect the elements so that a drive force is transmitted between the targeted elements upon the supply of the hydraulic pressure from the hydraulic pressure pump that actuates on the basis of the control command, for example, by the control ECU 2 via oil passages formed on the input shaft N and the housing H. Then, when the supply of the hydraulic pressure by the hydraulic pressure pump is blocked, the clutch plates are separated and the elements are disengaged from each other so that the drive force is not transmitted between the targeted elements.

The input shaft N is connected to the first carrier C1 via an input shaft connection member 3 that extends in the axial direction passing through an outer side relative to the first ring gear R1. The input shaft connection member 3 is provided with a power take off member M for taking out the power to the outside. The output shaft T is connected to the third carrier C3 via an output shaft connection member 4. The first ring gear R1 and the third sun gear S3 are connected via a first gear connection member 5 that extends in the axial direction passing through an inner side relative to the first sun gear S1. The second sun gear S2 and the third ring gear R3 are connected via a second gear connection member 6.

The first brake B1 brakes the rotation of the first sun gear S1 connected to a first brake connection member V1 via the first brake connection member V1. The second brake B2 brakes the rotation of the third ring gear R3 connected to a second brake connection member V2 via the second brake connection member V2.

The first clutch CL1 is connected to the second ring gear R2 via a first portion U11 of a first clutch connection member, and the first clutch CL1 selectively connects the first carrier C1 and the second ring gear R2 via a second portion U12 of the first clutch connection member that extends in the axial direction passing through an inner side relative to the first sun gear S1. The second clutch CL2 is connected to the first brake connection member V1 via a first portion U21 of a second clutch connection member, and selectively connects the first sun gear S1 and the second ring gear R2 via a second portion U22 of the second clutch connection member that is connected to the first portion U11 of the first clutch connection member.

The third clutch CL3 is connected to the second carrier C2 via a first portion U31 of a third clutch connection member, and the third clutch CL3 selectively connects the first ring gear R1 and the third sun gear S3, and the second carrier C2 via a second portion U32 of the third clutch connection member. The fourth clutch CL4 is connected to the third carrier C3 via a first portion U41 of a fourth clutch connection member, and the fourth clutch CL4 selectively connects the second carrier C2 and the third carrier C3 via a second portion U42 of the fourth clutch connection member that is connected to the first portion U31 of the third clutch connection member.

According to the automatic transmission 1 having the construction described above, eleven forward speeds and one reverse speed can be established by the restriction of the rotation of the elements of the first to third planetary gear mechanisms P1 to P3 by the selective actuation of the first to fourth clutches CL1 to CL4 and the first and second brakes B1, B2. FIG. 2 shows the operation states of the first to fourth clutches CL1 to CL4 and the first and second brakes B1, B2 corresponding each of speed stages. A circle marked in FIG. 2 indicates that the selected clutch and the brake are in an ON state (actuated state).

Generally, according to a single pinion type planetary gear mechanism, relationships of sun gear rotation speed Ns, carrier rotation speed Nc, ring gear rotation speed Nr, and a gear ratio (=the number of teeth of the sun gear/the number of teeth of the ring gear) λ of the planetary gear mechanism is described as Equation 1. The gear ratio at each shift stage (speed) is calculated on the basis of Equation 1. Provided that the numbers of teeth of the first to third sun gears S1-S3 of the first to third planetary gear mechanisms P1-P3 are defined as Zs1-Zs3 and the numbers of teeth of the first to third ring gears R1-R3 are defined as Zr1-Zr3, the gear ratios λ1-λ3 of the first to third planetary gear mechanisms P1-P3 are defined as follows: λ1=Zs1/Zr1, λ2=Zs2/Zr2, λ3=Zs3/Zr3.

$$Ns=(1+1/\lambda)\cdot Nc - 1/\lambda \cdot Nr \qquad \text{Equation 1:}$$

Figure 3:
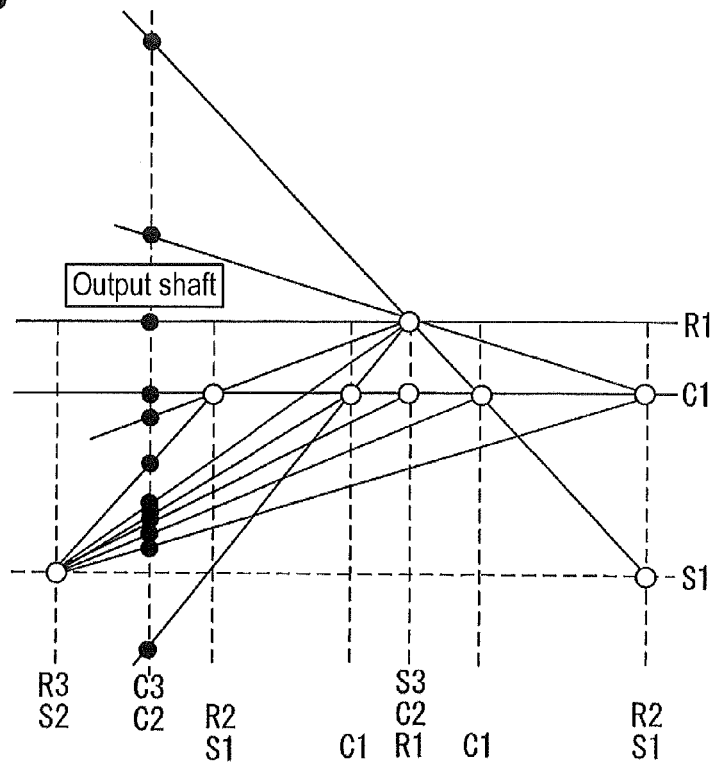
FIG. 3 shows a velocity diagram showing a rotation speed ratio of each element that structures a planetary gear mechanism at each of speed stages according to the first embodiment disclosed here.

When selectively actuating the first to fourth clutches CL1 to CL4 and the first and second brakes B1, B2, the rotation speed ratio of each element of the first to third planetary gear mechanisms P1 to P3 is assumed to be as shown in the velocity diagram in FIG. 3. In the velocity diagram, the elements of the planetary gear mechanisms including the sun gears, the carriers, and the ring gears are arranged with intervals corresponding to gear ratios in a lateral axial direction, and rotation speed ratios corresponding to the elements are arranged in a vertical direction.

For example, in a case where the first sun gear S1 and the second ring gear R2 are connected via the second clutch CL2 to be a single rigid member, a speed ratio common to the first sun gear S1 and the second ring gear R2 can be indicated on a single vertical line indicated with S1, R2. Further, in a case where the first ring gear R1, the second carrier C2 and the third sun gear S3 are connected via the third clutch CL3 to be a single rigid member, a speed ratio common to the connected first ring gear R1, the second carrier C2 and the third sun gear S3 can be indicated on a single line indicated with R1, C2, S3. A speed ratio of the first carrier C1 can be indicated on a single line indicated with C1. Still further, because the second sun gear S2 and the third ring gear R3 are always connected as a single rigid member, a speed ratio common to the connected second sun gear S2 and the third ring gear R3 can be indicated on a single line indicated with S2, R3. In those circumstances, a speed ratio is a ratio relative to a rotation speed of the input shaft N.

Because a single pinion type planetary gear mechanism is applied as the first planetary gear mechanism P1, a distance between the vertical line for the first sun gear S1 and the vertical line for the first carrier C1 is defined as one (1), and the vertical line for the first ring gear R1 is positioned at the position opposite from the vertical line for the first sun gear S1 relative to the vertical line for the first carrier C1, the vertical line for the first ring gear R1 positioned being away from, the vertical line for the first carrier C1 by a distance $\lambda 1$. Because a single pinion type planetary gear mechanism is applied as the second planetary gear mechanism P2, a distance between the vertical line for the second sun gear S2 and the vertical line for the second carrier C2 is defined as one (1), and the vertical line for the second ring gear R2 is positioned opposite from the vertical line for the second sun gear S2 relative to the vertical line for the second carrier C2, the vertical line for the second ring gear R2 positioned being away from the vertical line for the second carrier C2 by a distance $\lambda 2$. Because a single pinion type planetary gear mechanism is applied as the third planetary gear mechanism P3, a distance between the vertical line for the third sun gear S3 and the vertical line for the third carrier C3 is defined as one (1), and the vertical line for the third ring gear R3 is positioned opposite from the vertical line for the third sun gear S3 relative to the vertical line for the third carrier C3, the vertical line for the third ring gear R3 positioned being away from the vertical line for the third carrier C3 by a distance $\lambda 3$.

For example, in the first speed (first shift stage) according the automatic transmission 1 for vehicle, according to the operative engagement table shown in FIG. 2, the first clutch CL1, the third clutch CL3, and the second brake B2 are in operation (ON state). In those circumstances, first, by the actuation of the first clutch CL1, the first carrier C1 and the second ring gear R2 are integrally rotated, and the first ring gear R1, the second carrier C2, and the third sun gear S3 are integrally rotated by the actuation of the third clutch CL3. Because the second sun gear S2 is fixed by the second brake B2, the rotation drive force of the input shaft N outputted from the first carrier C1 is transmitted from the second carrier C2 to the third sun gear S3 and is transmitted from the first ring gear R1 to the third sun gear S3. Because the third ring gear R3 is fixed by the second brake B2, the speed of the rotational drive force inputted from the third sun gear S3 is reduced with a gear ratio in accordance with the number of teeth, and the rotational drive force is transmitted to the output shaft T from the third carrier C3 via the output shaft connection member 4.

In order to change the shift stages from the first speed (first shift stage) to the second speed (second shift stage), according to the automatic transmission 1 for the vehicle, the actuated engaging element is switched from the first clutch CL1 to the second clutch CL2 while maintaining the actuations of the third clutch CL3 and the second brake B2. In this state, first, by the actuation of the second clutch CL2, the first sun gear S1 and the second ring gear R2 are integrally rotated, and the first ring gear R1, the second carrier C2, and the third sun gear S3 are integrally rotated by the actuation of the third clutch CL3. The rotation drive force of the input shaft N outputted from the first carrier C1 is shared by the first sun gear S1 and the first ring gear R1. Because the second sun gear S2 is fixed by the second brake B2, the rotation drive force outputted from the first sun gear S1 is transmitted from the second carrier C2 to the third sun gear S3. Because the third ring gear R3 is fixed by the second brake B2, the speed of the rotational drive force inputted from the third sun gear S3 is reduced with a gear ratio in accordance with the number of teeth, and the rotational drive force is transmitted to the output shaft T from the third carrier C3 via the output shaft connection member 4.

According to the automatic transmission 1 for the vehicle, by selectively actuating three engaging elements among six engaging elements, as illustrated in the velocity diagram in FIG. 3, multiple speeds (multiple shift stages) having different gear ratios from one another are established. Further, according to the automatic transmission 1 for the vehicle, as shown in the operative engagement table shown in FIG. 2, by changing one of three actuated engaging elements, the shift stage is changed to an adjacent shift stage.

Figure 4:
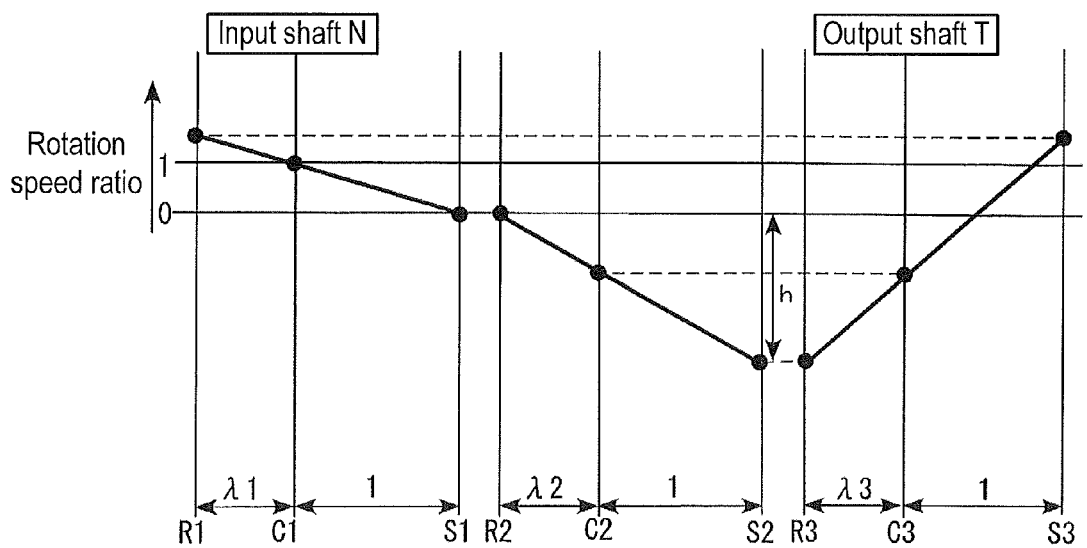
FIG. 4 shows a velocity diagram showing a rotation speed ratio of each element that structures the planetary gear mechanism when a reverse speed is established according to the first embodiment disclosed here.

As explained in Background Discussion, according to the known automatic transmission 10 for the vehicle, as illustrated in FIG. 16, because the second sun gear S12 rotates at high speed (rotation speed ratio H) when the reverse speed stage is established, there is a drawback, for example, the burning may easily be generated at the first brake B11 and the second clutch CL 12 because of an increase in a relative rotation speed relative to the housing H and the first sun gear S11, respectively. However, according to the construction of the automatic transmission 1 for the vehicle of the embodiment, as illustrated in FIG. 4, by the fixing of the first sun gear S1 and the second ring gear R2 by the actuation of the first brake B1 and the second clutch CL2 (ON state of the first brake B1 and the second clutch CL2) and by the connection of the second carrier C2 and the third carrier C3 by the actuation of the fourth clutch CL4 (ON state of the fourth clutch CL4), the drive force for reverse rotation is produced at the third carrier C3. The drive force for reverse rotation is outputted to the output shaft T via the third carrier C3.

The second sun gear S2 and the third ring gear R3 rotates at the same rotation speed (rotation number) and rotates at higher speed than the rotation (output rotation) of the third carrier C3. Calculating the rotation speed ratio of the second sun gear S2 of the second planetary gear mechanism P2, because the second ring gear R2 is fixed and the second carrier C2 exerts the output rotation, the rotation speed ratio of the second sun gear S2 is obtained as a value h which is obtained by multiplying the output rotation speed ratio and the sum of the reciprocal of the gear ratio $\lambda 2$ (=the number of the second sun gear S2/the number of the second ring gear R2) and one (1). Thus, according to the automatic transmission 1 for the vehicle of the embodiment, the rotation speed ratio h of the second sun gear S2 does not reach the rotation as high as the rotation speed ratio H of the second sun gear S12 of the known automatic transmission 10, that is, the rotation speed ratio h of the second sun gear S12 is reduced.

Further, according to the automatic transmission 1 for the vehicle of the embodiment, when the reverse speed is established, because the rotation of the input shaft N is inputted to the first carrier C1 and the first sun gear S1 is fixed by the first brake B1, the first ring gear R1 receives the rotation with the increased speed (the rotation to increase the speed) and the first ring gear R1 receives the same rotation with a case where the fifth, seventh, ninth, tenth, and eleventh speeds among forward speeds are established (receives the rotation having the same speed with the speed when fifth, seventh, ninth, tenth, and eleventh speeds among forward speeds are established), an abnormal rotation which is generated when a reverse speed is established in the known automatic transmission 10 does not occur.

According to the automatic transmission 1 of the first embodiment, the second brake B2 which is configured to selectively connect the second sun gear S2 and the third ring gear R3 to the housing H is restrained from being burned because a relative rotation speed of the housing H relative to the second sun gear S2 and the third ring gear R3 does not increase. Further, the durability of members, for example, a bearing that supports the second sun gear S2 is enhanced. Still further, in a case where an oil passage is formed on the shaft that is connected to the second sun gear S2, the durability of the sealing provided on the shaft is enhanced.

Figure 5:
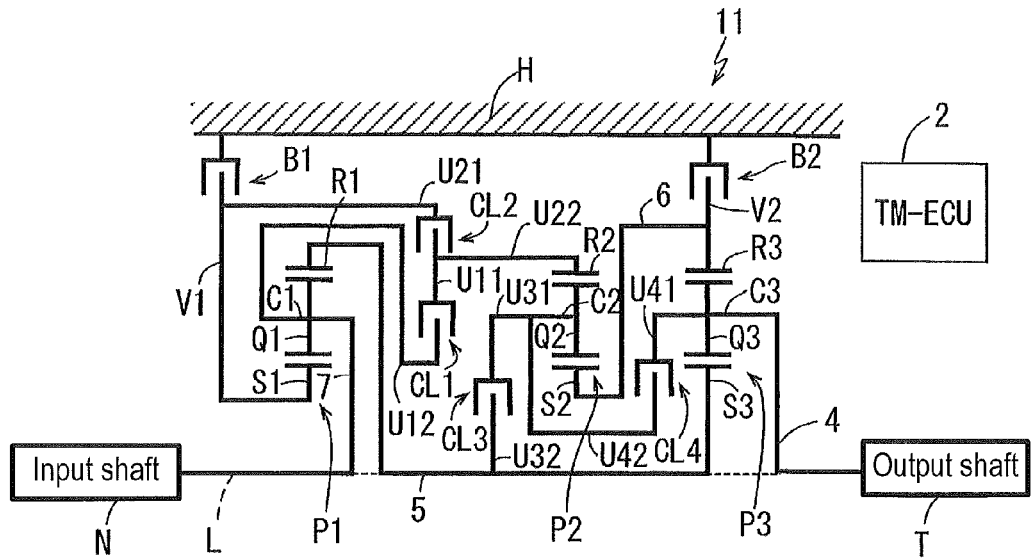
FIG. 5 is a schematic diagram of an automatic transmission for a vehicle according to a first modified example for the first embodiment disclosed here.

A first modified example of the first embodiment will be explained as follows. A construction of an automatic transmission 11 according to the first modified example of the first embodiment will be explained with reference to FIG. 5. In FIG. 5, the same numerals are provided to the members that are shown in FIG. 1, and the explanations for the common members to the first embodiment shown in FIG. 1 will not be repeated. The construction of the automatic transmission 11 for the vehicle is different from the construction of the automatic transmission 1 for the vehicle according to the first embodiment with respect to the construction that the input shaft N is connected to the first carrier C1 from a radially inner side of the first planetary gear mechanism P1. That is, the input shaft N is connected to the first carrier C1 via an input shaft connection member 7 that extends in the axial direction passing through the inner side relative to the first sun gear S1. According to the automatic transmission 11 for the vehicle with the foregoing construction, similar effects and advantages to the automatic transmission 1 for the vehicle according to the first embodiment can be attained.

Figure 6:
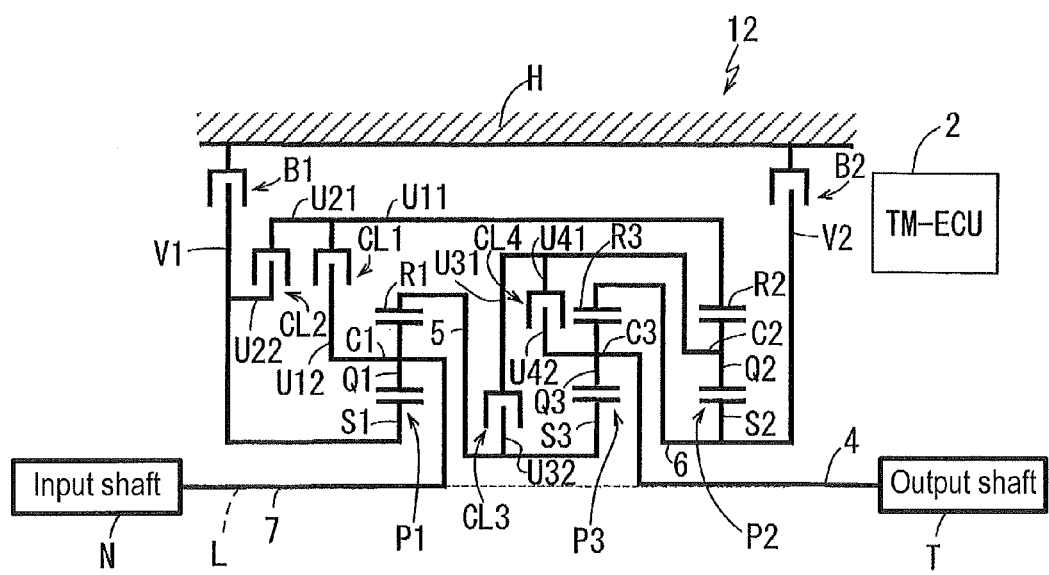
FIG. 6 is a schematic diagram of an automatic transmission for a vehicle according to a second modified example for the first embodiment disclosed here.

A second modified example of the first embodiment will be explained as follows. An automatic transmission 12 for a vehicle according to the second modified example of the first embodiment will be explained with reference to FIG. 6. In FIG. 6, the same numerals are provided to the members that are shown in FIG. 1, and the explanations for the common members to the first embodiment shown in FIG. 1 will not be repeated. The construction of the automatic transmission 12 for the vehicle is different from the construction of the automatic transmission 1 for the vehicle according to the first embodiment with respect to the construction that the positioning of the second planetary gear mechanism P2 and the third planetary gear mechanism P3 are switched. That is, in the automatic transmission 12 for the vehicle, the first planetary gear mechanism P1, the third planetary gear mechanism P3, and the second planetary gear mechanism P2 are disposed in the mentioned order from the input side (left-hand side in FIG. 1) to the output side (right-hand side in FIG. 1) in the axial direction. The input shaft N is connected to the first carrier C1 via the input shaft connection member 7 that extends in the axial direction passing through the inner side relative to the first sun gear S1. According to the automatic transmission 12 for the vehicle with the foregoing construction, similar effects and advantages to the automatic transmission 1 for the vehicle according to the first embodiment can be attained.

Figure 7:
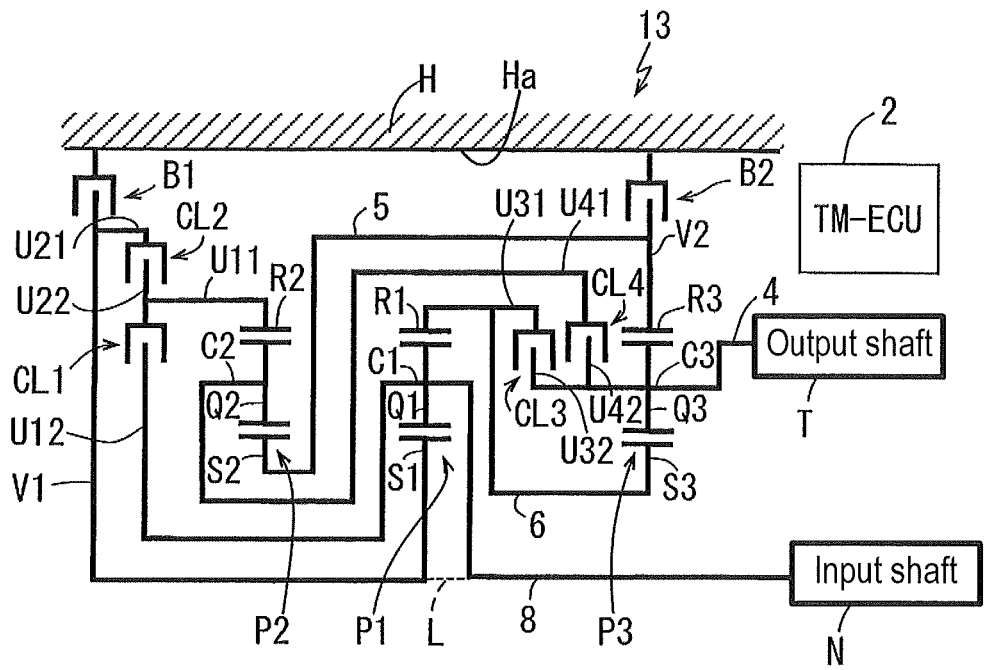
FIG. 7 is a schematic diagram of an automatic transmission for a vehicle according to a third modified example for the first embodiment disclosed here.

A third modified example of the first embodiment will be explained as follows. An automatic transmission 13 for a vehicle according to the third modified example of the first embodiment will be explained with reference to FIG. 7. In FIG. 7, the same numerals are provided to the members that are shown in FIG. 1, and the explanations for the common members to the first embodiment shown in FIG. 1 will not be repeated. The construction of the automatic transmission 13 for the vehicle is different from the construction of the automatic transmission 1 for the vehicle according to the first embodiment with respect to the construction that the positioning of the first planetary gear mechanism P1 and the second planetary gear mechanism P2 are switched and the construction that the input shaft N and the output shaft T are arranged in the same direction. That is, according to the automatic transmission 13 for the vehicle, the second planetary gear mechanism P2, the first planetary gear mechanism P1, and the third planetary gear mechanism P3 are disposed in the mentioned order from the input side (left-hand side in FIG. 1) to the output side (right-hand side in FIG. 1). The input shaft N extending from the output side is connected to the first carrier C1 via an input shaft connection member 8 that extends in the axial direction passing through the inner side relative to the third sun gear S3. According to the automatic transmission 13 for the vehicle with the foregoing construction, similar effects and advantages to the automatic transmission 1 for the vehicle according to the first embodiment can be attained.

Figure 8:
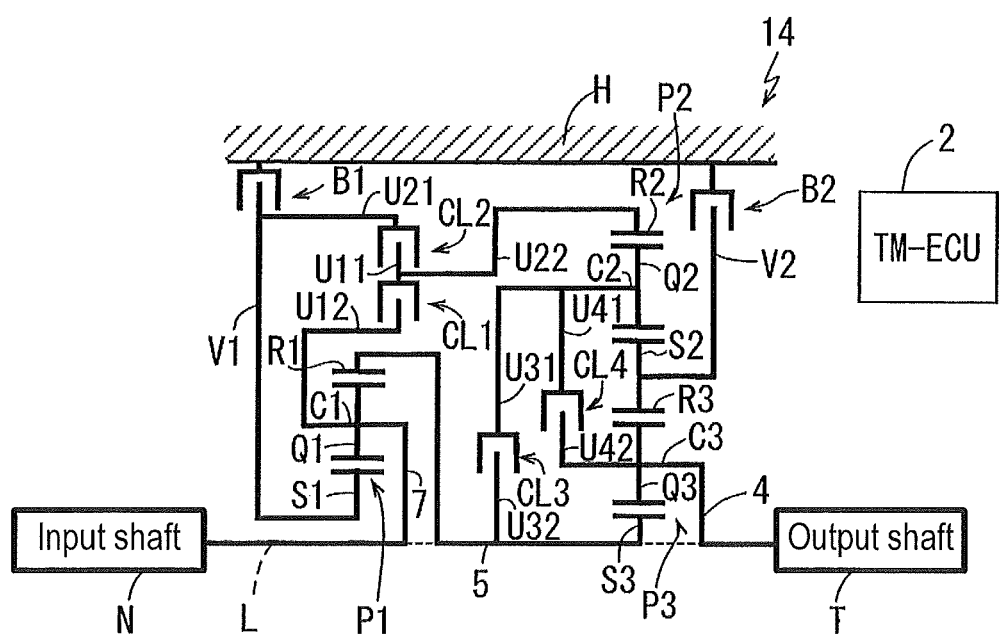
FIG. 8 is a schematic diagram of an automatic transmission for a vehicle according to a fourth modified example for the first embodiment disclosed here.

A fourth modified example of the first embodiment will be explained as follows. An automatic transmission 14 for a vehicle according to the fourth modified example of the first embodiment will be explained with reference to FIG. 8. In FIG. 8, the same numerals are provided to the members that are shown in FIG. 1, and the explanations for the common members to the first embodiment shown in FIG. 1 will not be repeated. The construction of the automatic transmission 14 for the vehicle is different from the construction of the automatic transmission 1 for the vehicle according to the first embodiment with respect to the construction that the second planetary gear mechanism P2 and the third planetary gear mechanism P3 are coaxially arranged in a manner that the second planetary gear mechanism P2 is disposed radially outward of the third planetary gear mechanism P3. In other words, the second planetary gear mechanism P2 is positioned outside of the third planetary gear mechanism P3 in a direction orthogonal to the axis L. That is, the second ring gear R2 of the second planetary gear mechanism P2 and the third sun gear S3 of the third planetary gear mechanism P3 are meshed with each other and are connected to the second brake connection member V2. According to the automatic transmission 14 for the vehicle with the foregoing construction, similar effects and advantages to the automatic transmission 1 for the vehicle according to the first embodiment can be attained.

Figure 9:
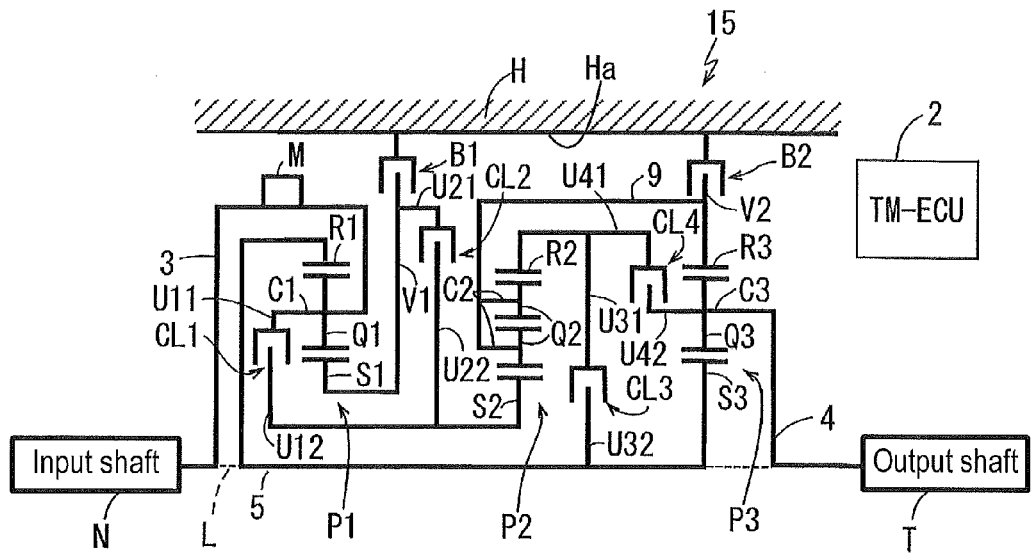
FIG. 9 is a schematic diagram of an automatic transmission for a vehicle according to a fifth modified example for the first embodiment disclosed here.
Figure 10:
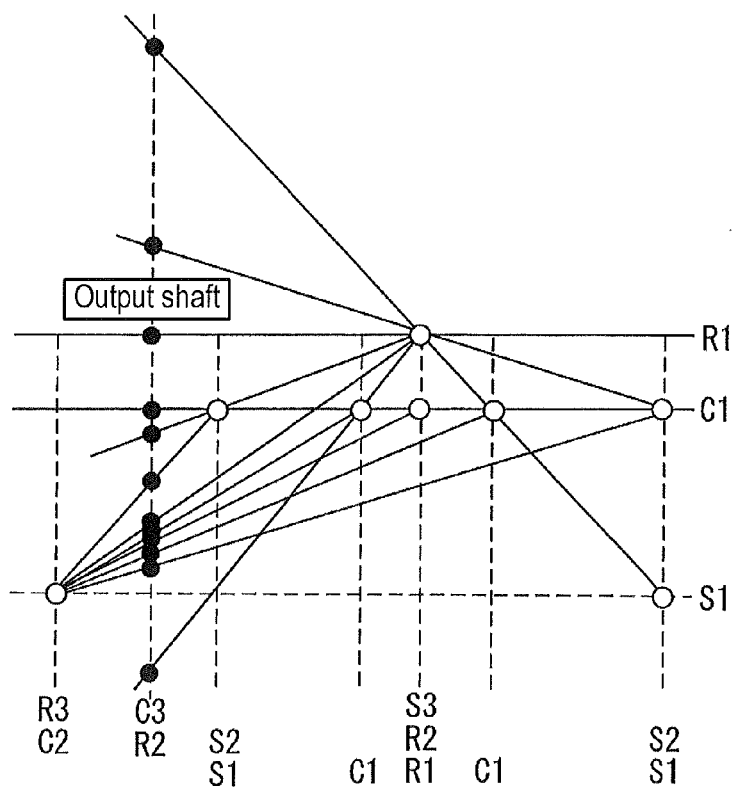
FIG. 10 shows a velocity diagram showing a rotation speed ratio of each element that structures a planetary gear mechanism at each of speed stages according to the fifth modified example for the first embodiment disclosed here.

A fifth modified example of the first embodiment will be explained as follows. An automatic transmission 15 for a vehicle according to the fifth modified example of the first embodiment will be explained with reference to FIGS. 9 and 10. In FIG. 9, the same numerals are provided to the members that are shown in FIG. 1, and the explanations for the common members to the first embodiment shown in FIG. 1 will not be repeated. The construction of the automatic transmission 15 for the vehicle is different from the construction of the automatic transmission 1 for the vehicle according to the first embodiment with respect to the construction that a double pinion type planetary gear mechanism is applied as the second planetary gear mechanism P2 instead of a single pinion type planetary gear mechanism. According to the fifth modified example of the first embodiment, because the double pinion type second planetary gear mechanism P2 is applied, each element of the second planetary gear mechanism P2 is arranged in the order as shown in the velocity diagram in FIG. 10, and the second carrier C2 corresponds to a first element, the second ring gear R2 corresponds to a second element, and the second sun gear S2 corresponds to a third element of the disclosure.

In the automatic transmission 15 for the vehicle, the second carrier C2 and the third ring gear R3 are connected via a third gear connection member 9. The first clutch CL1 is connected to the first carrier C1 via the first portion U11 of the first clutch connection member, and selectively connects the first carrier C1 and the second sun gear S2 via the second portion U12 of the first clutch connection member that extends in the axial direction passing through the inner side relative to the first sun gear S1. According to the automatic transmission 15 for the vehicle with the foregoing construction, similar effects and advantages to the automatic transmission 1 for the vehicle according to the first embodiment can be attained.

Figures 11, 12:
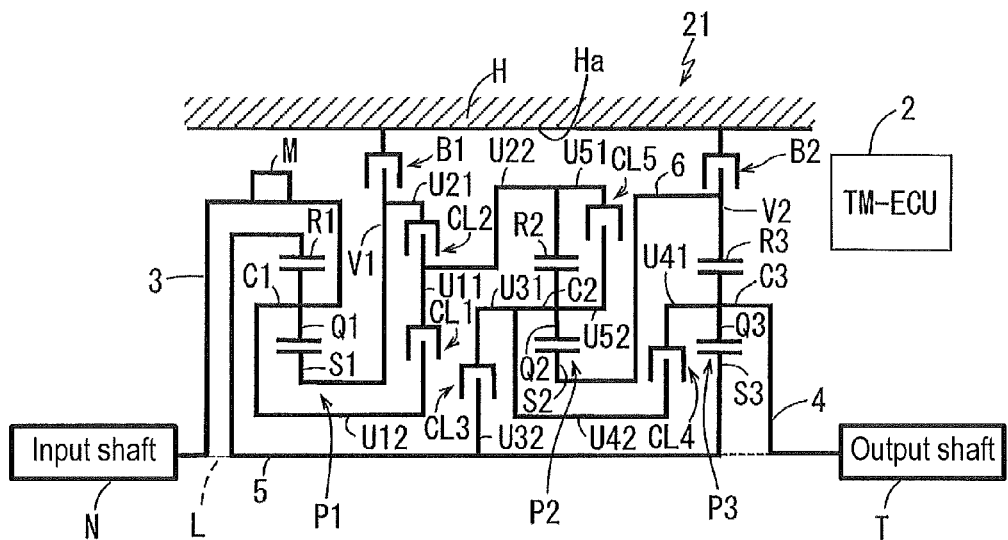
FIG. 11 shows a schematic diagram of an automatic transmission for a vehicle according to a second embodiment disclosed here.
FIG. 12 shows operation states of brakes and clutches at each of speed stages according to the second embodiment disclosed here.
Figure 13:
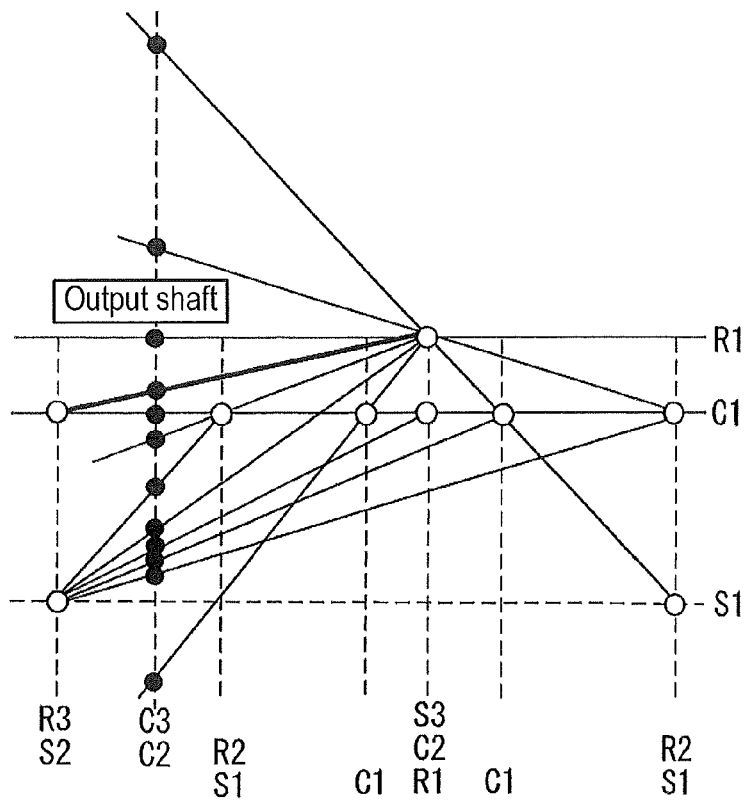
FIG. 13 shows a velocity diagram showing a rotation speed ratio of each element that structures a planetary gear mechanism at each of speed stages according to the second embodiment disclosed here.
Figure 14:
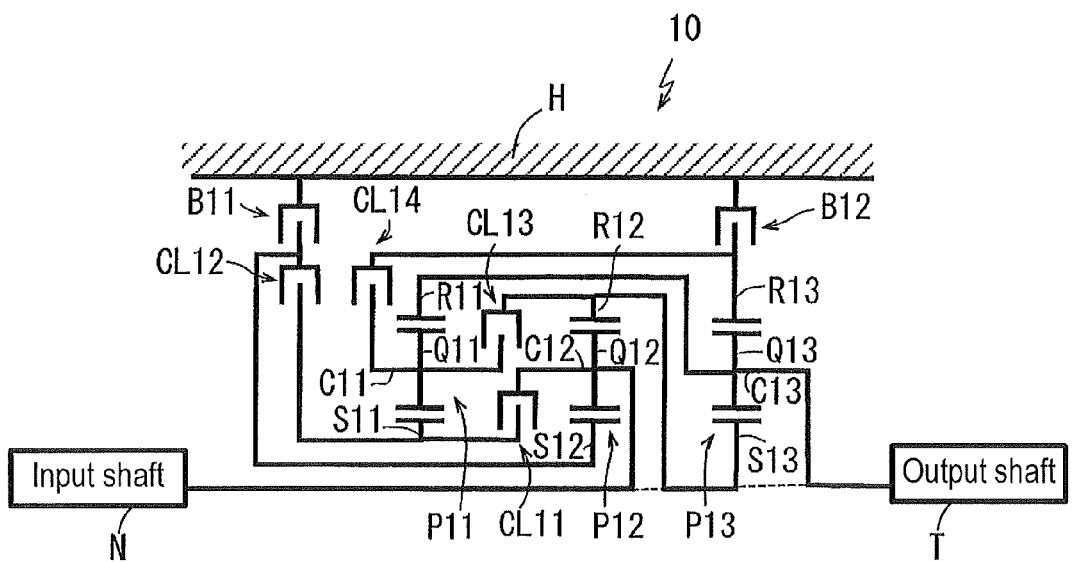
FIG. 14 shows a schematic diagram of a known automatic transmission for a vehicle.

A second embodiment will be explained with reference to FIGS. 11 to 13 as follows. An automatic transmission 21 for a vehicle according to the second embodiment is provided with a fifth clutch CL5 in addition to the construction of the automatic transmission 1 for the vehicle of the first embodiment. Connections of connection potions, clutches, and brakes according to the second embodiment are substantially the same to those of the first embodiment. The construction of the automatic transmission 21 for the vehicle that is different from the construction of the automatic transmission 1 for the vehicle according to the first embodiment will be explained with reference to FIGS. 11 to 13 as follows.

In the automatic transmission 21 for the vehicle, the fifth clutch CL5 is connected to the second ring gear R2 via a first portion U51 of a fifth clutch connection member, and the fifth clutch CL5 selectively connects the second ring gear R2 and the second carrier C2 via a second portion U52 of the fifth clutch connection member. As illustrated in FIG. 12, according to the automatic transmission 21 for the vehicle, by the actuation of the first clutch CL1, the first brake B1, and the fifth clutch CL5, the ninth speed is newly added between the eighth speed and the ninth speed of the automatic transmission 1 for the vehicle of the first embodiment, and thus twelve forward speeds can be established.

That is, when the first clutch CL1, the first brake B1, and the fifth clutch CL5 are actuated (i.e., ON states), the first carrier C1, the second ring gear R2, the second carrier C2, the second sun gear S2, and the third ring gear R3 are integrally rotated by the actuation of the first clutch CL1 and the fifth clutch CL5. Because the first sun gear S1 is fixed by the first brake B1, the speed of the rotation drive force of the input shaft N outputted from the first carrier C1 is increased and the increased rotation drive force of the input shaft N outputted from the first carrier C1 is transmitted from the first ring gear R1 to the third sun gear S3. As indicated with a solid bold line in FIG. 13, the third carrier C3 transmits the rotation drive force of a new speed stage (i.e., the ninth speed in FIG. 12) to the output shaft T via the output shaft connection member 4 on the basis of the rotation drive force transmitted to the third sun gear S3 and the rotation drive force transmitted to the third ring gear R3.

By the actuation of the first clutch CL1, the fourth clutch CL4, and the fifth clutch CL5 (when ON states of the first clutch CL1, the fourth clutch CL4, and the fifth clutch CL5 are established), the eighth speed which is similar to the eighth speed that is obtained by the actuation of the first clutch CL1, the third clutch CL3, and the fourth clutch CL4 can be established. Further, by the actuation of the fourth clutch CL4, the fifth clutch CL5, and the first brake B1 or by the actuation of the third clutch CL3, the fifth clutch CL5, and the first brake B1 (ON states of the fourth clutch CL4, the fifth clutch CL5, and the first brake B1 or ON states of the third clutch CL3, the fifth clutch CL5, and the first brake B1), the tenth speed which is similar to the tenth speed that is obtained by the actuation of the third clutch CL3, the fourth clutch CL4, and the first brake B1 (ON states of the third clutch CL3, the fourth clutch CL4, and the first brake B1) can be established.

According to the second embodiment, the fifth clutch CL5 selectively connects the second ring gear R2 and the second carrier C2, however, the construction is not limited. For example, alternatively, the fifth clutch CL5 may selectively connect the second ring gear R2 and the third ring gear R3 (or second sun gear S2). Because the third ring gear R3 and the second sun gear S2 are constantly in connection with each other, the third ring gear R3 and the second sun gear S2 are rotated at the same rotation speed, or the rotation number. Thus, here, the fifth clutch CL5 may selectively connect the second ring gear R2 and the second sun gear S2.

According to the automatic transmission 21 for the vehicle structured as explained above, similar to the automatic transmission 1 for the vehicle according to the first embodiment, twelve forward speeds and one reverse speed can be established by the selective actuations of the first to fifth clutches CL1 to CL5 and the first and second brakes B1, B2 to regulate, or restrict the rotations of the elements of the first to third planetary gear mechanisms P1 to P3. According to the construction of the automatic transmission 21 for the vehicle according to the second embodiment, the advantages and effects similar to the automatic transmission 1 for the vehicle according to the first embodiment can be attained. Unless otherwise remarked, it is clear that features of plural embodiments can be combined in a case where the plural embodiments are disclosed.

According to the embodiment, an automatic transmission for a vehicle includes a housing (H); three planetary gear mechanisms including a first planetary gear mechanism (P1) which is a single pinion type planetary gear mechanism, a second planetary gear mechanism (P2) which is one of a single pinion type planetary gear mechanism and a double pinion type planetary gear mechanism, and a third planetary gear mechanism (P3) which is a single pinion type planetary gear mechanism, the first planetary gear mechanism (P1), the second planetary gear mechanism (P2), and the third planetary gear mechanism (P3) being supported by the housing (H) and being coaxial to a rotation axis (L); a second sun gear (S2), a second carrier (C2), and a second ring gear (R2) in an arranged order in a velocity diagram being defined as a first element, a second element, and a third element, respectively, in a case where the single pinion type planetary gear mechanism is applied as the second planetary gear mechanism; the second carrier (C2), the second ring gear (R2), and the second sun gear (S2) in an arranged order in a velocity diagram being defined as the first element, the second element, and the third element, respectively, in a case where the double pinion type planetary gear mechanism is applied as the second planetary gear mechanism; a first ring gear (R1) of the first planetary gear mechanism (P1) and a third sun gear (S3) of the third planetary gear mechanism (P3) being connected to each other, and the first element of the second planetary gear mechanism and a third ring gear (R3) of the third planetary gear mechanism (P3) being connected to each other; an input shaft (N) supported by the housing to be rotatable about the rotation axis (L), the input shaft (N) connected to a first carrier (C1) of the first planetary gear mechanism (P1); an output shaft (T) supported by the housing to be rotatable about the rotation axis (L), the output shaft (T) connected to a third carrier (C3) of the third planetary gear mechanism (P3); a first brake (B1) selectively fixing a first sun gear (S1) of the first planetary gear mechanism (P1) to the housing (H); a second brake (B2) selectively fixing the first element (S2, C2) and the third ring gear (R3) which are connected to each other to the housing (H); a first clutch (CL1) selectively connecting the first carrier (C1) and the third element (R2, S2); a second clutch (CL2) selectively connecting the first sun gear (S2) and the third element (R2, S2); a third clutch (CL3) selectively connecting the first ring gear (R1) and the second element (C2, R2); and a fourth clutch (CL4) selectively connecting the second element (C2, R2) and the third carrier (C3). The first brake (1) fixes the first sun gear (S1) to the housing (H), the second clutch (CL2) connects the first sun gear (S1) and the third element (R2, S2), and the fourth clutch (CL4) connects the second element (C2, R2) and the third carrier (C3) when a reverse speed is established.

According to the automatic transmission of the embodiment, when the reverse speed stage is established, by the actuation of the first brake (B1) and the second clutch (CL2) (ON state) to fix the first sun gear (S1) of the first planetary gear mechanism (P1) and the third element (R2, S2) of the second planetary gear mechanism (P2) and by the actuation of the fourth clutch (CL4) (ON state) to connect the second element (C2, R2) of the second planetary mechanism (P2) and the third carrier (C3) of the third planetary gear mechanism (P3), a drive force for reverse rotation is generated at the second element (C2, R2) of the second planetary gear mechanism (P2). The drive force for reverse rotation is outputted to the output shaft (T) via the third carrier (C3) of the third planetary gear mechanism (P3).

The first element (S2, C2) of the second planetary gear mechanism (P2) and the third ring gear (R3) of the third planetary gear mechanism (P3) rotate at the same rotation speed (rotation number) and rotates at higher speed than the rotation (output rotation) of the third carrier (C3) of the third planetary gear mechanism (P3). However, the rotation of the first element (S2, C2) of the second planetary gear mechanism (P2) does not reach a high speed rotation compared to a known automatic transmission for a vehicle because the third element (R2, S2) of the second planetary gear mechanism (P2) is fixed and the second element (C2, R2) of the second planetary gear mechanism (P2) corresponds to an output rotation.

According to the embodiment, the first planetary gear mechanism (P1), the second planetary gear mechanism (P2), and the third planetary gear mechanism (P3) of the single pinion type planetary gear mechanism are disposed in a row in an above-described order from a side of the input shaft (N) to a side of the output shaft (T), or one of the second planetary gear mechanism (P2) and the third planetary gear mechanism (P3) is positioned radially outward of the other one of the second planetary gear mechanism (P2) and the third planetary gear mechanism (P3) so that an inner periphery of said one of the second planetary gear mechanism (P2) and the third planetary gear mechanism (P3) faces an outer periphery of the other one of the second planetary gear mechanism (P2) and the third planetary gear mechanism (P3). The first brake (B1) brakes a rotation of the first sun gear (S1) via a first brake connection member (V1) connected to the first sun gear (S1). The second clutch (CL2) is connected to the first sun gear (S1) via a first portion (U21) of a second clutch-connection member connected to the first brake connection member (V1), the second clutch (CL2) selectively connects the first sun gear (S1) and the third element (R2) via a second portion (U22) of the second clutch-connection member connected to the third element (R2). The fourth clutch (CL4) is connected to the third carrier (C3) via a first portion (U41) of a fourth clutch-connection member, the fourth clutch (CL4) selectively connects the second element (C2) and the third carrier (C3) via a second portion (U42) of the fourth clutch-connection member that is connected to the second element (C2) at the input shaft side.

In addition to the above described advantages and effects, according to the construction of the automatic transmission for the vehicle, the following advantages and effects can be attained. Other than being connected to the first brake connection member (V1) of the first brake (B1), the first sun gear (S1) of the first planetary gear mechanism (P1) is not necessary to be connected to other elements of the planetary gear mechanisms and other engaging elements. Thus, the input shaft connection member (3, 7, 8) connected to the first carrier (C1) of the first planetary gear mechanism (P1) connected to the input shaft (N) can be arranged through a path positioned close to an inner periphery surface of the housing (H). Accordingly, irrespective to the selected speed stages, the power of the rotation that is always with the same rotation number to the input rotation can be transferred, or drawn as a power take off (PTO) from the input shaft connection member (3, 7, 8) connected to the first carrier (C1) of the first planetary mechanism (P1).

According to the embodiment, the automatic transmission for the vehicle includes a fifth clutch (CL5) selectively connects the third element (R2) and the second element (C2), and selectively connects the third element (R2) and the first element (S2) or the third element (R2) and the third ring gear (R3). The first planetary gear mechanism (P1), the second planetary gear mechanism (P2), and the third planetary gear mechanism (P3) of the single pinion type planetary gear mechanism are disposed in a row in a described order from a side of the input shaft (N) to a side of the output shaft (T), or one of the second planetary gear mechanism (P2) and the third planetary gear mechanism (P3) is positioned radially outward of the other one of the second planetary gear mechanism (P2) and the third planetary gear mechanism (P3) so that an inner periphery of said one of the second planetary gear mechanism (P2) and the third planetary gear mechanism (P3) faces an outer periphery of the other one of the second planetary gear mechanism (P2) and the third planetary gear mechanism (P3). The first brake (B1) brakes a rotation of the first sun gear (S1) via a first brake connection member (V1) connected to the first sun gear (S1). The second clutch (CL2) is connected to the first sun gear (S1) via a first portion (U21) of a second clutch-connection member connected to the first brake connection member (V1), the second clutch (CL2) selectively connects the first sun gear (S1) and the third element (R2) via a second portion (U22) of the second clutch-connection member connected to the third element (R2). The fourth clutch (CL4) is connected to the third carrier (C3) via a first portion (U41) of a fourth clutch-connection member, the fourth clutch (CL4) selectively connects the second element (C2) and the third carrier (C3) via a second portion (U42) of the fourth clutch-connection member that is connected to the second element (C2) at the input shaft side. The fifth clutch (CL5) is connected to the third element (R2) via a first portion (U51) of a fifth clutch-connection member that is connected to the third element (R2), and the fifth clutch (CL5)

selectively connects the third element (R2) and the second element (C2), and selectively connects the third element (R2) and the first element (S2) or the third element (R2) and the third ring gear (R3) via a second portion (U52) of the fifth clutch-connection member connected to the second element (C2) and the first element (S2) or the third ring gear (R3). The first brake (B1) fixes the first sun gear (S1) to the housing (H), the first clutch (CL1) connects the first carrier (C1) and the third element (R2), and the fifth clutch (CL5) connects the third element (R2) and the second element (C2), and connects the third element (R2) and the first element (S2) or the third element (R2) and the third ring gear (R3) in a state where an additional forward speed is established.

According to the construction of the automatic transmission for the vehicle, in addition to the above described advantages and effects, the following advantages and effects can be attained. By the actuation of the first clutch (CL1) and the fifth clutch (CL5), the first carrier (C1) of the first planetary gear mechanism (P1), all elements of the second planetary gear mechanism (P2), and the third ring gear (R3) of the third planetary gear mechanism (P3) integrally rotate. The rotation drive force of the input shaft (N) outputted from the first sun gear (S1) of the first planetary gear mechanism (P1) is transmitted from the first ring gear (R1) of the first planetary gear mechanism (P1) to the third sun gear (S3) of the third planetary gear mechanism (P3) because the first ring gear (R1) of the first planetary gear mechanism (P1) is fixed by the first brake (B1). Then, the third carrier (C3) of the third planetary gear mechanism (P3) can transmit the rotation drive force of the additional speed stage to the output shaft (T) on the basis of the rotation drive force being transmitted to the third ring gear (R3) of the third planetary gear mechanism (P3) and the rotation drive force being transmitted to the third sun gear (S3) of the third planetary gear mechanism (P3).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic transmission for a vehicle, comprising:
a housing;
three planetary gear mechanisms including a first planetary gear mechanism which is a single pinion type planetary gear mechanism, a second planetary gear mechanism which is one of a single pinion type planetary gear mechanism and a double pinion type planetary gear mechanism, and a third planetary gear mechanism which is a single pinion type planetary gear mechanism, the first planetary gear mechanism, the second planetary gear mechanism, and the third planetary gear mechanism being supported by the housing and being coaxial to a rotation axis; a second sun gear, a second carrier, and a second ring gear in an arranged order in a velocity diagram being defined as a first element, a second element, and a third element, respectively, in a case where the single pinion type planetary gear mechanism is applied as the second planetary gear mechanism; the second carrier, the second ring gear, and the second sun gear in an arranged order in a velocity diagram being defined as the first element, the second element, and the third element, respectively, in a case where the double pinion type planetary gear mechanism is applied as the second planetary gear mechanism; a first ring gear of the first planetary gear mechanism and a third sun gear of the third planetary gear mechanism being connected to each other, and the first element of the second planetary gear mechanism and a third ring gear of the third planetary gear mechanism being connected to each other;
an input shaft supported by the housing to be rotatable about the rotation axis, the input shaft connected to a first carrier of the first planetary gear mechanism;
an output shaft supported by the housing to be rotatable about the rotation axis, the output shaft connected to a third carrier of the third planetary gear mechanism;
a first brake selectively fixing a first sun gear of the first planetary gear mechanism to the housing;
a second brake selectively fixing the first element and the third ring gear which are connected to each other to the housing;
a first clutch selectively connecting the first carrier and the third element;
a second clutch selectively connecting the first sun gear and the third element;
a third clutch selectively connecting the first ring gear and the second element; and
a fourth clutch selectively connecting the second element and the third carrier; wherein
the first brake fixes the first sun gear to the housing, the second clutch connects the first sun gear and the third element, and the fourth clutch connects the second element and the third carrier when a reverse speed is established.

2. The automatic transmission for the vehicle according to claim 1, wherein the first planetary gear mechanism, the second planetary gear mechanism, and the third planetary gear mechanism of the single pinion type planetary gear mechanism are disposed in a row in an above-described order from a side of the input shaft to a side of the output shaft, or one of the second planetary gear mechanism and the third planetary gear mechanism is positioned radially outward of the other one of the second planetary gear mechanism and the third planetary gear mechanism so that an inner periphery of said one of the second planetary gear mechanism and the third planetary gear mechanism faces an outer periphery of the other one of the second planetary gear mechanism and the third planetary gear mechanism;
the first brake brakes a rotation of the first sun gear via a first brake connection member connected to the first sun gear;
the second clutch is connected to the first sun gear via a first portion of a second clutch-connection member connected to the first brake connection member, the second clutch selectively connects the first sun gear and the third element via a second portion of the second clutch-connection member connected to the third element;
the fourth clutch is connected to the third carrier via a first portion of a fourth clutch-connection member, the fourth clutch selectively connects the second element and the third carrier via a second portion of the fourth clutch-connection member that is connected to the second element at the input shaft side.

3. The automatic transmission for the vehicle according to claim 1 further comprising:

a fifth clutch selectively connects the third element and the second element, and selectively connects the third element and the first element or the third element and the third ring gear;

wherein the first planetary gear mechanism, the second planetary gear mechanism, and the third planetary gear mechanism of the single pinion type planetary gear mechanism are disposed in a row in a described order from a side of the input shaft to a side of the output shaft, or one of the second planetary gear mechanism and the third planetary gear mechanism is positioned radially outward of the other one of the second planetary gear mechanism and the third planetary gear mechanism so that an inner periphery of said one of the second planetary gear mechanism and the third planetary gear mechanism faces an outer periphery of the other one of the second planetary gear mechanism and the third planetary gear mechanism;

the first brake brakes a rotation of the first sun gear via a first brake connection member connected to the first sun gear;

the second clutch is connected to the first sun gear via a first portion of a second clutch-connection member connected to the first brake connection member, the second clutch selectively connects the first sun gear and the third element via a second portion of the second clutch-connection member connected to the third element;

the fourth clutch is connected to the third carrier via a first portion of a fourth clutch-connection member, the fourth clutch selectively connects the second element and the third carrier via a second portion of the fourth clutch-connection member that is connected to the second element at the input shaft side;

the fifth clutch is connected to the third element via a first portion of a fifth clutch-connection member that is connected to the third element, and the fifth clutch selectively connects the third element and the second element, and selectively connects the third element and the first element or the third element and the third ring gear via a second portion of the fifth clutch-connection member connected to the second element and the first element or the third ring gear; and wherein the first brake fixes the first sun gear to the housing, the first clutch connects the first carrier and the third element, and the fifth clutch connects the third element and the second element, and connects the third element and the first element or the third element and the third ring gear in a state where an additional forward speed is established.

* * * * *